United States Patent
Streater et al.

[11] 3,727,706
[45] Apr. 17, 1973

[54] TARE SETTING APPARATUS AND METHOD

[75] Inventors: August L. Streater; Donald A. Bonness, both of Bluffton, Ind.

[73] Assignee: Franklin Electric Co., Inc., Bluffton, Ind.

[22] Filed: Apr. 21, 1972

[21] Appl. No.: 246,162

[52] U.S. Cl. ............... 177/1, 177/125, 177/165, 177/176
[51] Int. Cl. ................. G01g 9/00, G01g 13/14
[58] Field of Search................. 177/1, 25, 125, 176, 177/165, DIG. 1; 194/21, 35, 47

[56] References Cited

UNITED STATES PATENTS

| | | | |
|---|---|---|---|
| 2,010,666 | 8/1935 | Haskins | 177/176 |
| 2,566,711 | 9/1951 | Walls et al. | 177/125 X |

*Primary Examiner*—George H. Miller, Jr.
*Attorney*—Lowell C. Noyes et al.

[57] ABSTRACT

A tare setting arrangement and associated control circuitry for a scale system wherein the pan or platform of the system, on which the articles to be weighed are placed, includes means for supporting a plurality of tare weights. The weights have different values which are equivalent to the tare values expected to be encountered during operation of the scale. Before weighing an article, all of the tare weights are placed by an operator in the support means and the system output is set to indicate zero weight. Thereafter, before weighing an article having a known tare value, a tare weight equivalent to the tare value of the article is removed from the support means by the operator, and the article is then weighed. When operated properly, the system gives an accurate indication of the article weight less tare, or net weight, because the removed tare weight offsets or compensates for the tare of the article. To ensure that the operator places all of the weights in the support means when setting the system to zero, and also removes one of the weights before weighing an article, a holder for the removed tare weight is provided, and control circuitry is connected in the holder to sense the presence of a weight. The system is prevented from being set to indicate zero weight if a tare weight is in the holder, and the system is prevented from making normal weighing operations when a tare weight is not in the holder.

14 Claims, 6 Drawing Figures

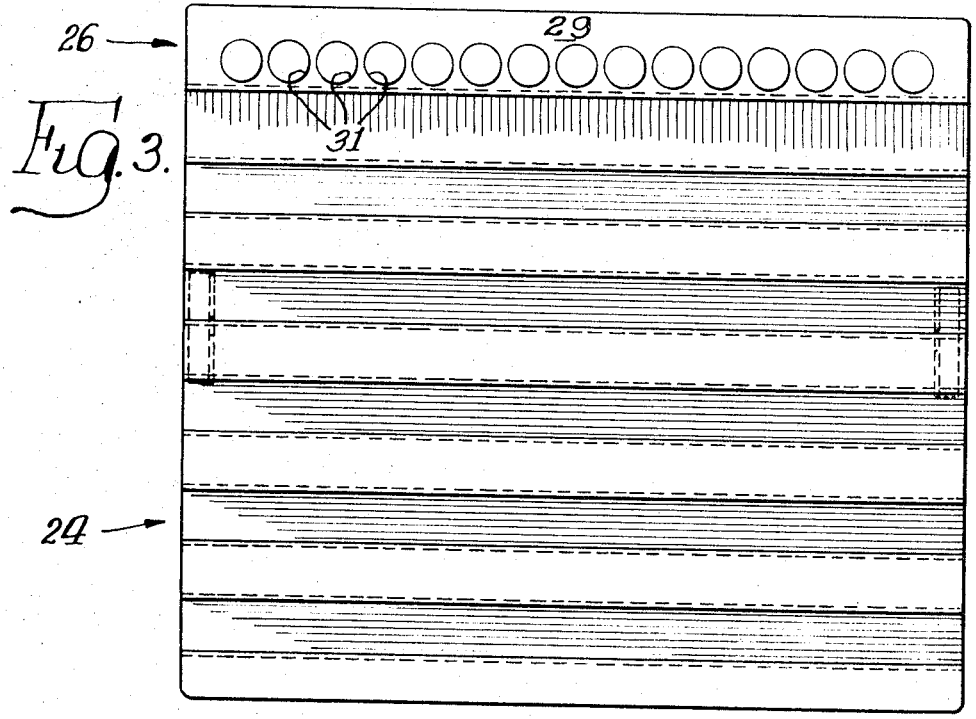
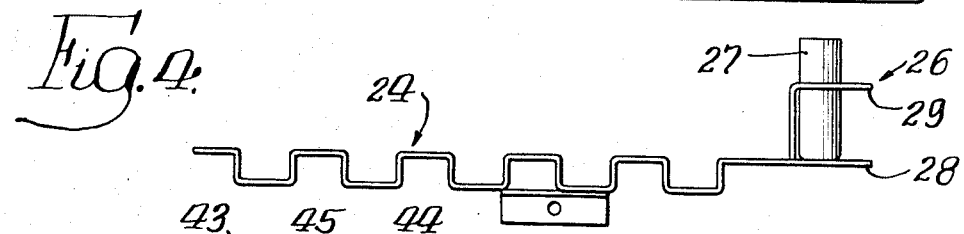
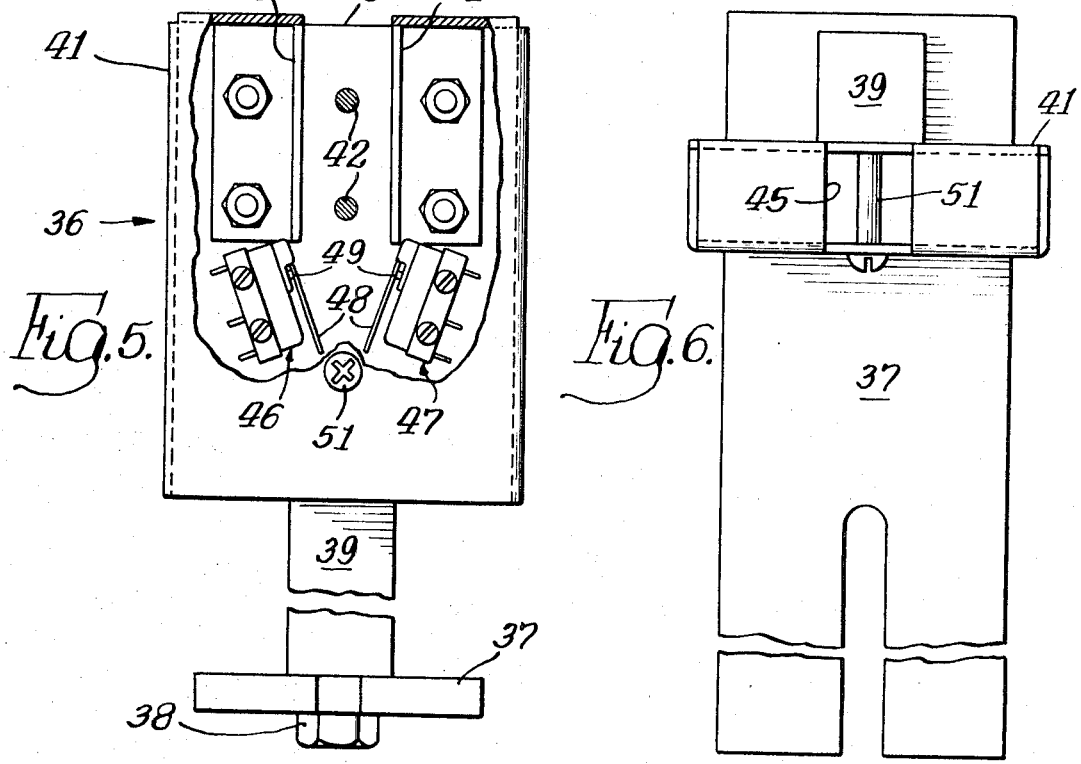

TARE SETTING APPARATUS AND METHOD

Numerous arrangements have been provided in the past for setting tare in a scale. For example, springs have been used to exert a force on the scale pan, the spring force being manually adjustable to a value which offsets or compensates for tare. Another tare setting arrangement is disclosed in the Haskins U.S. Pat. No. 2,010,666 wherein a number of weights are attached to a scale platform and one or more of the weights are removed during a weighing operation. Still another arrangement which has been used in a computer-scale is disclosed in Karp U.S. Pat. No. 3,262,639, wherein a computer includes a tare register which stores a tare value and subtracts it from each scale reading.

The first type of arrangement mentioned above has the disadvantage of being subject to the skill of the operator in making an adjustment, whereas the second type is subject to the reliability of the operator in removing the weights. The third mentioned arrangement is relatively expensive.

It is therefore an object of this invention to provide a scale system including a tare setting arrangement which is accurate, simple in operation, inexpensive to manufacture, and includes control circuitry requiring that the operator make the necessary adjustments. A scale system incorporating the invention comprises weighing means including a pan on which articles to be weighed are placed, means connected to the pan for supporting a plurality of tare weights, the tare weights corresponding to various tare values, and control circuitry for preventing operation of the system unless an operator properly sets tare into the system. In a preferred form of the invention there is provided a holder which is adapted to receive one tare weight and there is provided means for setting the system output signal to represent zero weight. The control circuitry responds to the presence of a tare weight in said holder for preventing a zero setting operation while one of said tare weights is in said holder and for preventing normal weighing operation without a tare weight in said holder.

Other objects, features and advantages of the present invention will be apparent from the following detailed description taken in conjunction with the accompanying figures of the drawings, wherein:

FIG. 3 is a plan view of a scale pan of the system;

FIG. 4 is a side view of the pan shown in FIG. 3;

FIG. 5 is a view of the tare weight holder of the system partially broken away; and FIG. 6 is another view of the holder shown in FIG. 5.

Figure 1:
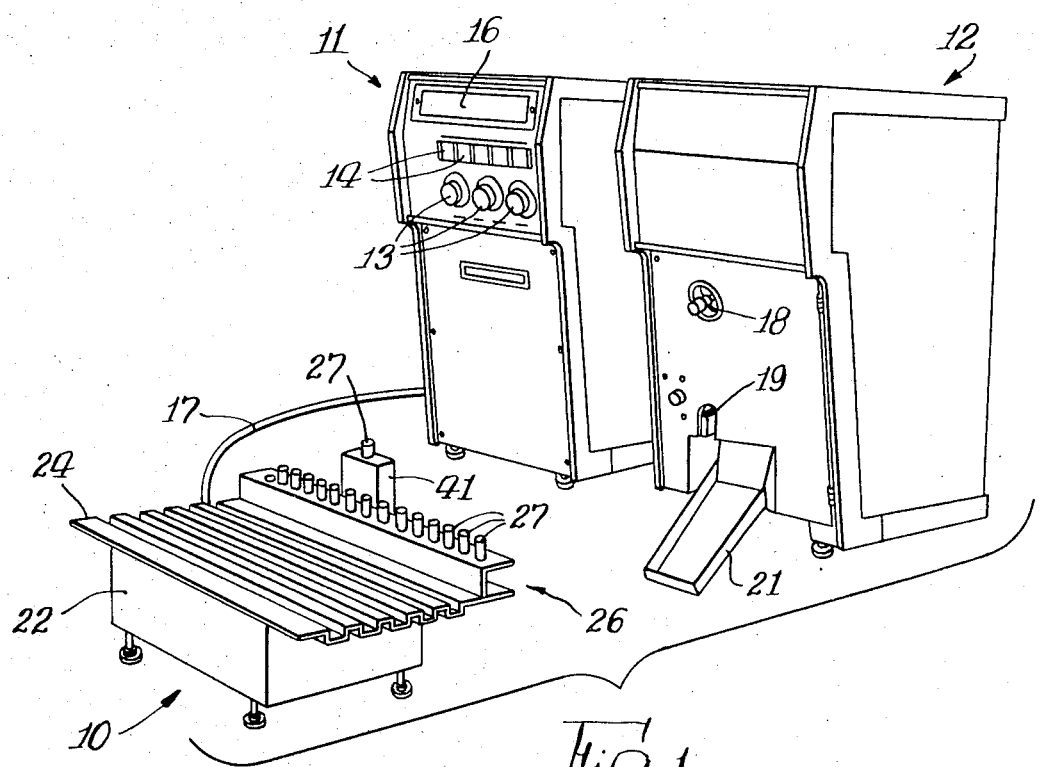
FIG. 1 is a perspective view of a computer-scale system embodying the invention.

With reference to the drawings, FIG. 1 shows a computer scale including a weighing unit 10, a computer unit 11, and a label printer unit 12. The unit 11 includes circuitry for computing total price and weight information, price setting dials 13, manually operated control push buttons 14, and a space 16 for status lights and a visual weight display. The unit 11 receives weight information and control signals from the unit 10 by a cable 17, and feeds the computed information to the printer unit 12. The unit 12 includes provisions for a code selector 18 and a print slug 19, and includes a label chute 21 which receives printed labels from the printing mechanism of the unit 12.

The unit 10 includes a housing 22 for a weight sensing cell 23 (FIG. 2) and a scale platform or pan 24 which is connected to the cell 23. While the weight sensing cell may be of the character disclosed in the Streater et al application U.S. Ser. No. 89,736, filed Nov. 16, 1970, other types of cells may also be used. The platform 24 is movably mounted on the housing 22 and in the present instance it has a flat horizontal surface which has a series of channels formed in it.

At the backside of the platform 24 is fastened a tare weight holder or rack 26 (FIGS. 1, 3 and 4) which supports a plurality of tare weights 27. As shown in FIGS. 1 and 4, the holder 26 comprises, in the present instance, an extension 28 of the pan 24 which forms a lower supporting plate, and an upper plate 29 which is vertically spaced above the lower extension 28. The upper plate 29 has a plurality of holes 31 (FIG. 3) formed therein, which receive the tare weights 27. As shown in FIG. 4, the lower extension 28 supports the weights 27 while the upper plate 29 prevents lateral movement of the weights.

The values of the tare weights 27 are selected or adjusted to be equal to the values of tare normally encountered during operation of the scale. For a scale of the character used in a supermarket to handle packaged meats, the article consists of a piece of meat, the tray and wrapping material, and tare consists of the weight of the tray and wrapping material and may be in the range of 0.05 pound. Thus, one of the tare weights 27 would have a value of 0.05 pound and the other weights 27 would have different values both greater and less than 0.05 pound. Each tare weight 27 preferably consists of a small covered container, such as a small plastic bottle, partially filled with a granular material such as, for example, lead shot, such arrangement enabling the value of each tare weight to be accurately adjusted. There should be one tare weight 27 for each value of tare expected to be encountered during operation of the scale.

Fastened to the rear side of the frame 22 of the weighing unit 10 is a tare weight support 36 (FIGS. 1, 5 and 6) which is adapted to receive one of the tare weights 27. The tare weight support 36 includes a platelike mounting bracket 37 which is fastened by a bolt 38 to a vertically extending support post 39. The bracket 37 is fastened to the frame 22 as previously mentioned, and the post 39 extends vertically upwardly to the rear of and above the level of the rack 26 at the rearside of the pan 24, and a box-shaped holder 41 is secured as by screws 42 to the forward side of the bracket 39. The holder 41, in the present instance, is made of sheet metal and supports within its interior two angle-shaped brackets 43 and 44, one on each side of a centrally located opening 45 in the top side of the holder 41. The spacing between the two brackets 43 and 44 and the size of the opening 45 is slightly larger than the dimensions of one of the tare weights 27, so that an operator of the system can insert any one of the tare weights 27 into the opening 45.

Within the holder 41 below the two brackets 43 and 44 are provided two micro-switches 46 and 47, each of which includes an actuating leaf 48 and a button 49. A bolt 51 is fastened to and extends through the holder 41 at a position directly below the opening 45 and between the lower ends of the two leaves 48. The bolt 51 is located so that a tare weight 27 positioned by an operator in the opening 45 will be supported on the bolt, with the upper end of the weight 27 being accessible above the holder 41 as is shown in FIG. 1. The two leaves 48 are located on opposite sides of the bolt 51 at position s where they are engaged by the lower end of a tare weight supported on the bolt, the weight of a tare weight 27 being sufficient to actuate the switches 46 and 47.

One of the two switches 46 and 47 is connected into a set zero circuit and requires the operator to remove any tare weight from the holder 41 and position it in the rack 26 before making a set zero adjustment on the scale. The other of the two switches 46 and 47 is connected to a prevent weighing operation unless one of the tare weights 27 is positioned on the holder 41.

Figure 2:
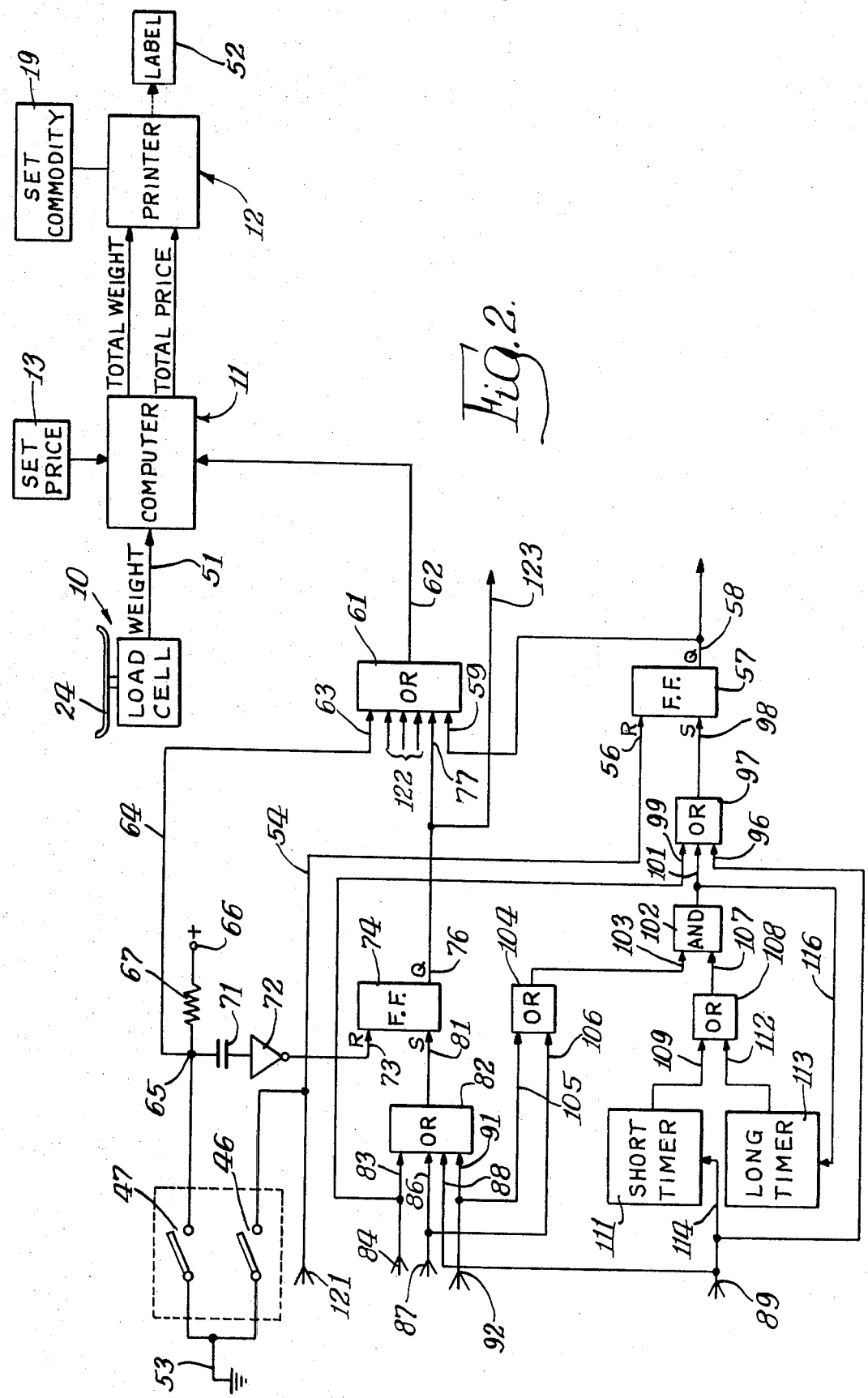
FIG. 2 is a block diagram of the system.

In FIG. 2, the system is represented schematically and includes the unit 10, the computer unit 11 and the printer unit 12, previously mentioned. The computer unit 11 computes the total weight and total price of an article being weighed in response to a weight representative signal supplied on an output 51 of the unit 10 and in response to the setting of the set price switches 13. The printer unit 12 prepares a label 52 which usually includes weight and price information as well as an identification of the commodity being sold and the unit price of the commodity.

The system further includes a circuit for controlling the operation of the system to ensure that an operator of the system places all of the weights 27 in the rack 26 prior to initiating a set zero operation, to be described, and also to ensure that the operator removes one of the weights 27 from the rack 26 prior to starting a normal weighing operation. With reference to FIG. 2, the control circuit comprises the two normally open switches 46 and 47 which are mounted in the tare holder 36 (FIG. 5) in positions to sense the presence of a tare weight in the holder. One side of each of the two switches 46 and 47 is connected to a ground or reference potential 53. The other side of the switch 46, which is referred to herein as the set zero switch, is connected by a conductor 54 to a reset input 56 of a flip-flop 57. The Q output 58 of the flip-flop 57 is connected to control energization of a set zero indicator, such as a lamp (not shown) which is located in the space 16 (FIG. 1). The Q output 58 is also connected to an input 59 of an OR gate 61, the output 62 of the OR gate 61 being connected to the computer 11 circuitry. The signal appearing on the output 62 constitutes an inhibit signal when it is at logic one or is high, due to one of the OR gate 61 inputs being at logic one, and such an inhibit signal prevents operation of the computer circuit 11. When the signal on the output 62 is at logic zero, or is low, the computer circuit 11 is rendered operative.

The OR gate 61 includes another input 63 which is connected by a conductor 64 to a junction 65 on the other side of the switch 47, which is referred to herein as the weigh switch. The junction 65 is also connected to a positive potential source 66 through a resistor 67. When the switch 47 is open, the input 63 is at logic one due its connection to the positive potential source 66 and consequently an inhibit signal appears at the output 62. However, when the switch 47 is closed, the input 63 falls to ground, or logic zero, and the inhibit signal on the input 63 is removed.

The junction 65 of the conductor 64 with the switch 47 is also connected through a capacitor 71 and an inverter 72 to the reset input 73 of another flip-flop 74. The resistor 67 and the capacitor 71 constitute a pulse-forming network, and when the junction 65 potential falls to ground level upon closing of the switch 47, a negative pulse appears at the input of the inverter 72. The negative pulse is inverted by the inverter 72 resulting in a positive pulse on the input 73 which resets the flip-flop 74. The Q output 76 of the flip-flop 74 is connected to another input 77 of the OR gate 61, and when the flip-flop 74 is set, the Q output 76 is high and an inhibit signal appears at the input 77. However, when the flip-flop 74 is reset by a positive pulse at the input 73, the Q output 76 falls and thus removes the inhibit at the input 77.

The flip-flop 74 also includes a set input 81 which is connected to the output of an OR gate 82. An input 83 of the OR gate 82 is connected to receive a start set zero signal on an input 84, and another input 86 is connected to receive a set price signal on another input 87, another input 88 is connected to receive a power-on signal on another input 89, and still another input 91 is connected to receive a set commodity signal on still another input 92. A high signal on any of the inputs 84, 87, 89 and 92 results in a high signal appearing at the set input 81 which sets the flip-flop 74.

The input 89, which is connected to receive a power-on signal, is also connected to an input 96 of an OR gate 97 which has its output connected to the set input 98 of the flip-flop 57. The OR gate 97 includes another input 99 which is connected to receive the start set zero signal appearing on the input 84, and a third input 101 of the OR gate 97 is connected to the output of an AND gate 102. The AND gate 102 includes a first input 103 which is connected to an output of an OR gate 104, and two inputs 105 and 106 of the OR gate 104 are respectively connected to the inputs 87 and 92.

The AND gate 102 includes a second input 107 connected to the output of an OR gate 108 which has two inputs 109 and 112. The input 109 is connected to an output of a short term timer 111, and the other input 112 is connected to the output of a long term timer 113. The short term timer 111 is connected by a conductor 114 to be started in its timing cycle by a power-on signal appearing on the input 89. The long term timer 113 is connected by a conductor 116 to be started in its timing cycle by a signal appearing at the output of the AND gate 102.

The circuit further includes another input 121 which is connected by the conductor 54 to the reset input 56 of the flip-flop 57. The OR gate 61 may include additional inhibit inputs, indicated by the numeral 122, which may be connected to sensors which respond to such factors as motion of the weighing platform 24 and the presence or absence of a label in the label chute 21 of the printer unit 12 (FIG. 1).

The Q output 76, of the flip-flop 74, is also connected by a conductor 123 to control operation of a change tare indicator, such as a lamp (not shown), which is also located in the space 16 along with the set zero indicator.

Considering the operation of the control circuitry of the system, when the system is to be used to weigh one or more articles, the operator connects electrical power to the system and a power-on signal appears at the input 89. This signal consists of a positive signal which passes through the OR gate 97 and sets the flip-flop 57. Upon setting of the flip-flop 57, its Q output 58 becomes positive or high and the set zero lamp is turned on. The power-on signal also passes through the OR gate 82 and sets the flip-flop 74. The Q output of the flip-flop 74 therefore also becomes high and, due to the connection 123, the change tare lamp is also turned on. Positive signals appear at the inputs 59 and 77 of the OR gate 61 and result in a positive signal at the output 62 which is connected to inhibit operation of the computer 11.

After power has been connected to the system, the operator sets the price of the commodity into the system by turning the dials or knobs 13. After the price has been entered, a positive set price signal is received at the input 87 which appears on the input 86 of the OR gate 82, but since the flip-flop 74 has already been set by the power-on signal from the input 89, it does not change the status of the circuit. Similarily, after the operator has set the commodity into the printer, a set commodity signal is received at the input 92 and at the output of the OR gate 82, but again this signal does not change the status of the circuit because the flip-flop 74 is already set. The set price and set commodity signals also pass through the OR gate 104 to the input 103 of the AND gate 102, but, without a simultaneous input signal at the input 107, no output signal appears at the output of the AND gate 102. A signal does not appear at the input 107 until the expiration of the timing period of the timer 111 or the timer 113, as will be explained. The purpose of the short term timer 111 is to ensure that the operator again adjusts the system shortly after it has been started up. The long term timer 113 is provided to ensure that the operator of the system periodically readjusts the system.

After the power has been turned on and the price and commodity adjustments have been made by the operator, the operator initiates a set zero cycle as by pressing one of the buttons 14. Pressing of this button results in a positive start set zero signal being received on the input 84 and a positive signal appearing on the inputs 83 and 99 of the two OR gates 82 and 97, respectively. Both of the flip-flops 74 and 57 connected to the outputs of the OR gates 82 and 97 are already set, and therefore the start set zero signal does not change the status of the system. The system then progresses automatically through a set zero cycle which is described in detail in the copending application of John A. Whitney, U.S. Ser. No. 194,981, filed Nov. 2, 1971, and entitled Apparatus for Elimination of Error in a Detecting System. At the completion of the set zero cycle, a positive set zero complete signal is received at the input 121, and this signal appears on the conductor 54 and at the normally open set zero switch 46. Consequently, if one of the tare weights 27 is in the holder 41, the switch 46 will be closed and the set zero complete signal will be shorted to ground 53. However, if there is no tare weight 27 in the holder 41, the switch 46 will be open and the signal on the conductor 54 will appear at the reset input 56 and it will reset the flip-flop 57. This action causes the Q output 58 to fall to logic zero and thereby turn off the set zero lamp. In addition, when the Q output 58 falls, the inhibit signal appearing on the input 59 of the OR gate 61 is removed.

The operator then removes one of the tare weights 27 from the rack 26 as previously explained and places the tare weight in the holder 41, thereby closing the two switches 46 and 47. Since the flip-flop 57 has already been reset, this action does not change the status of the flip-flop 57. However, closing of the switch 47 results in the junction 65 of the resistor 67 and the capacitor 71 falling to ground potential, and a negative pulse appears at the input of the inverter 72 which inverts the pulse. A positive pulse thus appears on the reset input 73 of the flip-flop 74, resetting the flip-flop 74 and causing the Q output 76 to fall to zero. Therefore, the inhibit signal at the input 77 of the OR gate 61 is also removed, and the change tare lamp connected to the conductor 123 is also turned off.

When the switch 47 is closed, the conductor 64 also falls to ground potential and the inhibit signal appearing at the input 63 of the OR gate 61 is also removed. If the remaining inhibit signals of the system appearing at the inputs 122 are also removed, the output 62 will fall to logic zero and the system is then ready for normal weighing operation. It will be noted that the operator must keep one of the tare weights in the holder 41 to maintain the switch 47 closed in order to keep the system in operation, because if the switch 47 were opened, the input 63 and the output 62 of the OR gate 61 would be at logic one. Thus, the control circuitry requires first of all that the operator remove any tare weight 27 from the holder 41 prior to initiating a set zero operation, and the system further requires that the operator place one of the tare weights 27 in the holder 41 after completion of the set zero operation, before the system will be rendered operable.

As previously mentioned, the timer 111 has a relatively short term of, in the present illustration, 8 minutes. After the system has been operating for this period of time, a positive signal appears at the input 109 of the OR gate 108 and at the input 107 of the AND gate 102. In spite of this signal, the system will temporarily continue in normal operation because signals must simultaneously appear at both of the inputs 103 and 107 before an output signal will appear from the AND gate 102. The next instance when the operator changes either the price dials 13 or makes a commodity change, a signal will be received at one or both of the inputs 87 and 92 and also at the input 103. Consequently, when the timer 111 has completed its timing cycle and on the next commodity or price change, the flip-flop 57 will receive a signal on its set input 98 resulting in setting of this flip-flop. The Q output 58 then again becomes positive causing the set zero lamp to be turned on and an inhibit signal to appear at the input 59 and at the output 62 of the OR gate 61. The operator must then remove the tare weight 27 from the holder 41, replace it on the rack 26 and then press the set zero button in order to set the system in operation once again as previously explained. The signal appearing at the output of the AND gate 102 also generates a signal on the conductor 116 initiating the operation of the long term timer 113 which preferably has a timing period in the neighborhood of four hours. At the end of the timing period of the timer 113, the input 107 of the AND gate 102 again becomes positive and, on the next instance when the operator changes either the price or the commodity, the flip-flop 57 will be set, and the operator must again reset the system as previously explained. It will be noted that the long term timer 113 is started in a new timing cycle, due to the connection 116, each time it has completed a timing cycle.

During operation of the system, if the type of commodity and/or the price is changed, positive signals appear at the inputs 87 and 92 which pass through the OR gate 82 and set the flip-flop 74. The Q output 76 becomes positive and an inhibit signal appears at the input 77 and at the output 62 of the OR gate 61. In addition, the change tare lamp connected to the conductor 123 is turned on. The set zero lamp is not turned on however unless one of the timers 111 and 113 has just completed its timing cycle. To return the system to normal operation, it is necessary for the operator to remove the tare weight 27 from the holder 41 and thereby open the switch 47. When a tare weight, either the one previously used or a different one, is again placed in the holder 41, the switch 47 is closed and a positive signal appears at the output of the inverter 72 which resets the flip-flop 74. The lamp connected to the conductor 123 is again turned off and the inhibit signal on the output 62 of the OR gate 62 is also removed, permitting return to normal operation of the system.

Considering the operation of the system as a whole, an operator connects power to the system and thereby energizes the three units 10, 11 and 12, including the control circuit. Without an article to be weighed on the scale pan 24, the operator makes a set zero adjustment by placing all of the tare weights 27 in the rack 26. As previously mentioned, if the operator permits one of the tare weights 27 to remain in the holder 41, the closed switch 46 prevents the system from making a set zero adjustment. After the operator has placed all of the weights 27 in the rack 26, the operator presses the switch 145 disclosed in the previously mentioned Whitney application U.S. Ser. No. 194,981 which initiates a set zero cycle to, in effect, ensure that the signal received by the total price and weight computing circuits of the computer 11 represents zero weight. The input 84 may be connected to the output of the flip-flop 147 disclosed in the Whitney application Ser. No. 194,981. At the end of a set zero cycle, the input 121 receives a positive signal from, for example, the output of the inverter 36 disclosed in Whitney application Ser. No. 194,981. Thereafter, the operator determines the tare of an article or series of articles to be weighed. In a supermarket the weights of the trays and wrapping material are known by the operator beforehand. The operator then selects the tare weight 27 having a weight which is equal to the determined tare of the article, removes the weight from the rack 26 and positions it in the holder 41. The removal of the tare weight 27 offsets the tare of the article, and consequently the computing circuits receive an accurate representation of the net weight of the article.

From the foregoing it will be apparent that the two switches 46 and 47 form interlocks which require the operator to perform certain acts before he can weigh an article. As shown in FIG. 4, the two switches 46 and 47 are preferably located sufficiently far down in the holder 41 that an operator cannot actuate the switches 46 and 47 as by pressing them with his finger, and must place a tare weight in the holder 41.

Further, the arrangement of the tare weights is advantageous in that an adjustment of tare may readily be made without the need for mechanisms which may become defective. Using bottles filled with shot is also advantageous because the values of the weights may easily be adjusted.

The following is a listing of applications filed by the assignee of the present application covering other circuits of the scale system shown in FIG. 1.

| Inventor | Ser. No. | File Date | Title |
| --- | --- | --- | --- |
| Streater et al. | 89,736 | Nov. 16, 1970 | Weight Sensing Cell |
| Whitney et al. | 194,858 | Nov. 2, 1971 | Change Detector System |
| Whitney | 194,981 | Nov. 2, 1971 | Apparatus for elimination of Error in a Measuring System |
| Sorensen | 194,986 | Nov. 2, 1971 | Signal Synchronization Circuit and Counting System |

The output 62 of the OR gate 61 may be connected, for example, to an input of the NOR gate 43 disclosed in the Whitney application Ser. No. 194,981 to prevent a weighing operation while the output 62 is positive. The inputs 87, 92 and 89 may be connected, for example, to the Q outputs of separate flip-flops (not shown) which are set by actuation of a switch connected to sense a change in price or commodity and the introduction of power to the system.

It should be apparent that either fluidic or electronic circuit components may be used for most of the components described herein. While the assignment of logic levels herein is the case where logic one is high and logic zero is low, a similar system may be provided with an opposite assignment of logic levels. Further, while a system has been described wherein tare adjustments are made by providing removable weights, tare adjustments could instead be made by applying releasable forces to the scale pan using, for example, springs, or electromagnets. In such an alternate arrangement, the switches 46 and 47 would be located to sense the application of a force by one of the springs or magnets.

I claim:

1. A scale system comprising weight sensing means providing an output signal, circuit means responsive to said signal for computing the total weight and price of articles being weighed, a pan movably connected to said sensing means and adapted to receive an article to be weighed, a plurality of tare weights, said tare weights having different values which are respectively equivalent to different tares of articles to be weighed, a support for said tare weights attached to said pan, zero setting means for setting said signal to represent zero weight with all of said tare weights in said support, and interlock means separate from said pan and operable to receive one of said tare weights to prevent operation of said system after operation of said zero setting means in the presence of a tare weight in said interlock means.

2. A method of setting tare in a scale including a weight sensing cell providing a weight representative signal, and an article receiving pan connected to said cell, said method comprising the steps of positioning a plurality of weights on said pan, said weights having different values approximately equivalent to the tares of different articles to be weighed, determining the tare of an article to be weighed, removing from said pan a weight having a value substantially equivalent to said determined tare, placing said removed weight in a holder, and weighing said articles or duplicates of said articles only while said weight is in said holder.

3. A method according to claim 2, and further including the step of adjusting said weight representative signal to represent zero weight after positioning said weights on said pan.

4. In a scale system including weight sensing means providing a weight representative signal, computer means having an input connected to receive said signal and another input connected to receive a price setting, said sensing means and said computer means further including zero setting means for adjusting said weight representative signal to indicate zero weight, the improvement comprising operator adjustable means connected to said weight sensing means for setting tare in said system, and control circuit means connected to sense adjustment of said adjustable means and connected to said computer means to prevent operation thereof if tare is set during operation of said zero setting means and also to prevent operation thereof if said tare is not set during normal weighing operation.

5. Apparatus as in claim 4, wherein said control circuit further includes timing means connected to inhibit operation of said computer means after a predetermined time, and circuit means for enabling operation of said computer means after operation of said zero setting means.

6. In a scale system including weight sensing means providing a weight representative signal, computer means having an input connected to receive said signal and another input connected to receive a price setting, said sensing means and said computer means further including zero setting means for adjusting said weight representative signal to indicate zero weight, the improvement comprising tare means including a plurality of members, separately connectable manually to said weight sensing means, and a control circuit including switch means sensing the presence of any of said members not connected to said weight sensing means, said control circuit further including means connected to enable operation of said computer means after operation of said zero setting means only when said switch means does not sense one of said members during said zero setting operation.

7. Apparatus as in claim 6, wherein said control circuit further includes means connected to enable operation of said computer means during normal weighing operation only when said switch means senses one of said members.

8. A scale system comprising a weight sensing cell, a pan movably connected to said cell and adapted to receive an article to be weighed, a plurality of removable tare weights, said tare weights having different values which are respectively equivalent to different tares of articles to be weighed, support means for said tare weights attached to said pan, and interlock means separate from said pan and adapted to receive one of said tare weights, said interlock means being connected to prevent a weighing operation in the absence of a tare weight in said interlock means, whereby one of said tare weights must be placed in said interlock means to render said system operable.

9. A scale system as in claim 8, wherein said interlock means comprises a holder for one of said tare weights, and a switch located in said holder, said switch being actuated by said one tare weight when positioned in said holder.

10. A scale system as in claim 9, wherein said holder includes an enclosure having an opening therein in which said one of said tare weights is positioned, and said switch is located in said enclosure a distance from said opening.

11. Apparatus for use in a scale including a weight sensing cell, said scale being used to weigh one or more articles having a known tare, said apparatus comprising a pan adapted to be movably connected to said cell, a plurality of tare weights, said tare weights having different values and there being one tare weight having a value equivalent to said known tare, and support means on said pan for said tare weights, said pan being a generally horizontal article receiving member, and said support means being located at one side of said member, said one tare weight being removed from said support means prior to weighing said article, whereby the removal of said tare weight compensates for or offsets said known tare and said cell produces an accurate indication of the net weight of said article.

12. Apparatus as in claim 11, and further including holder means for one of said tare weights, said holder means being separate from said pan and said cell, and said holder means including interlock switch means actuated by one of said tare weights in said holder means and connected to control operation of said scale.

13. Apparatus as in claim 11, wherein each of said tare weights comprises a container and a relatively heavy material at least partially filling said container.

14. Apparatus as in claim 13, wherein said material is granular.

* * * * *